United States Patent [19]

Ende

[11] Patent Number: 5,222,438
[45] Date of Patent: Jun. 29, 1993

[54] AERODYNAMIC FAIRING/BRAKE FOR HIGH-SPEED TRAINS

[75] Inventor: Robert E. Ende, Commack, N.Y.

[73] Assignee: Grumman Aerospace Corporation, Bethpage, N.Y.

[21] Appl. No.: 913,924

[22] Filed: Jul. 17, 1992

[51] Int. Cl.$^5$ .................................... B62D 35/00
[52] U.S. Cl. ................................ 105/1.1; 105/1.3; 188/270; 296/180.1
[58] Field of Search .............. 105/1.1, 1.2, 1.3, 1.4, 105/3, 8.1; 296/180.1, 180.2, 180.3, 180.4, 180.5; 188/33, 270

[56] References Cited

U.S. PATENT DOCUMENTS

| | | | |
|---|---|---|---|
| 4,142,755 | 3/1979 | Keedy | 296/180.2 |
| 4,214,787 | 7/1980 | Chain | 105/1.2 |
| 4,433,865 | 2/1984 | Crompton | 296/180 X |
| 4,746,160 | 5/1988 | Wiesemeyer | 105/1.1 |
| 4,824,165 | 4/1989 | Fry | 296/180.3 |
| 4,883,307 | 11/1989 | Hacker et al. | 296/180.2 |
| 4,904,015 | 2/1990 | Haines | 296/180.3 |

FOREIGN PATENT DOCUMENTS

| | | | |
|---|---|---|---|
| 0765828 | 7/1949 | Fed. Rep. of Germany | 188/270 |
| 0299330 | 12/1989 | Japan | 188/270 |

*Primary Examiner*—Mark T. Le
*Attorney, Agent, or Firm*—Pollock, VandeSande & Priddy

[57] ABSTRACT

A series of adjacent flaps is hinge-mounted to the end of a high-speed train car. The actuatable flaps normally assume a fairing mode to close the gap between adjacent train cars and reduce aerodynamic drag. The flaps may be rotated to an inclined position so as to create drag braking when this becomes necessary.

1 Claim, 1 Drawing Sheet

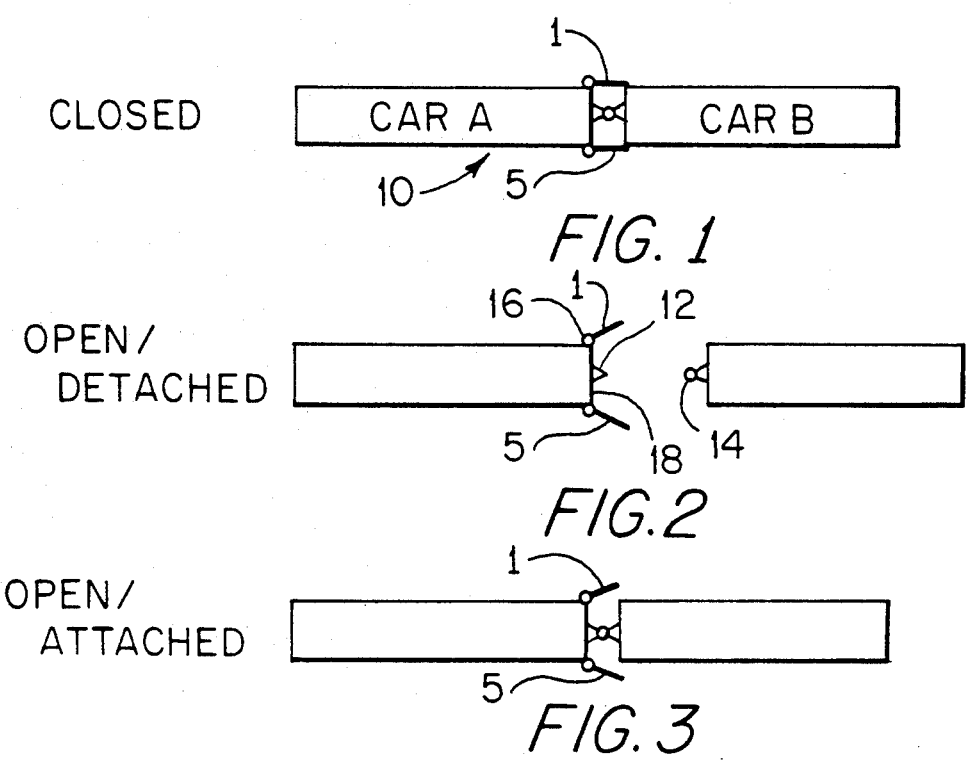
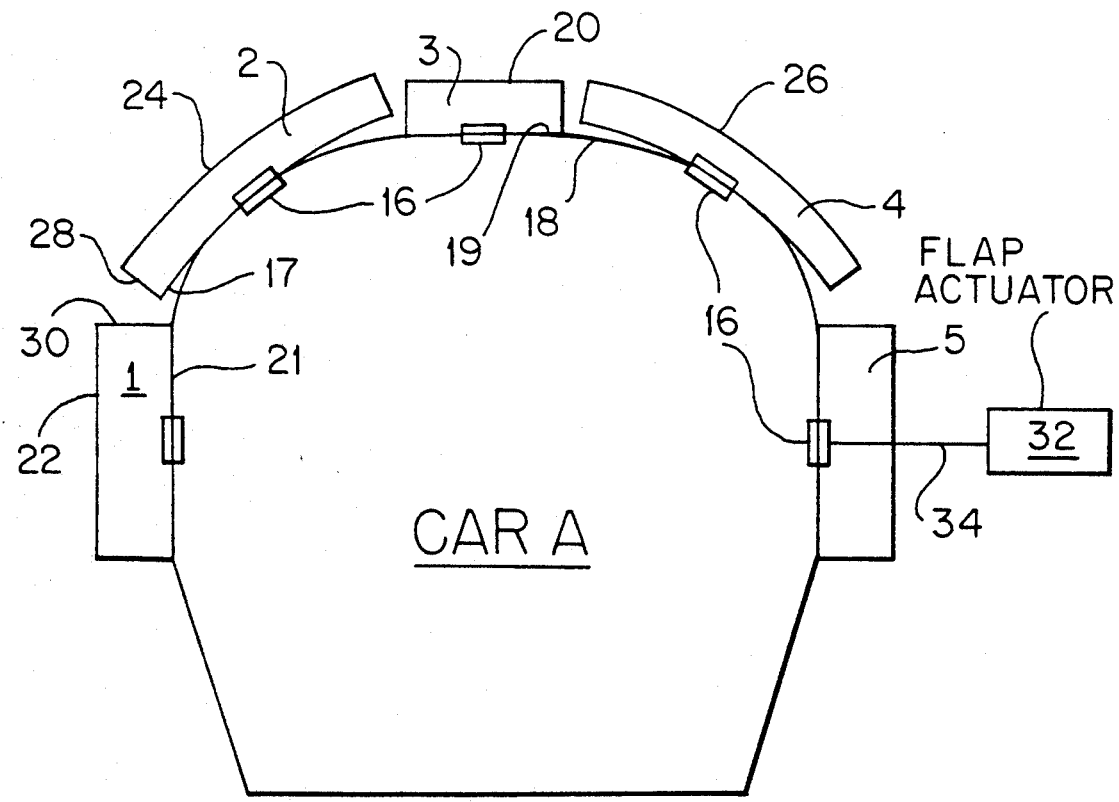

AERODYNAMIC FAIRING/BRAKE FOR HIGH-SPEED TRAINS

FIELD OF THE INVENTION

The present invention relates to drag reduction devices for high-speed trains, and more particularly to such a device which is also capable of functioning as a drag brake.

BACKGROUND OF THE INVENTION

With increased popularity of high-speed trains, including magnetically levitated (MAGLEV) trains, two fundamental operational concerns become more important. The first is to decrease the drag created by discontinuities between cars when the train is in high-speed operation. The second problem is to enhance the braking capability of such a vehicle.

BRIEF DESCRIPTION OF THE PRESENT INVENTION

The present invention utilizes a series of flaps extending around the circumference of a gap existing between adjacent cars of a train. The actuatable flaps serve two functions:
- to act as an aerodynamic fairing between cars in a train thereby reducing the drag due to gaps between cars;
- to act as an aerodynamic drag brake for slowing the vehicle in emergency situations, or simply as a back-up braking system. The advantage of the present invention is the ability to serve two functions at the same time while maintaining mechanical simplicity and reliability. By serving two roles, the invention saves weight over designs requiring separate fairings and auxiliary brakes.

BRIEF DESCRIPTION OF THE FIGURES

The above-mentioned objects and advantages of the present invention will be more clearly understood when considered in conjunction with the accompanying drawings, in which:

FIG. 1 is a diagrammatic top plan view of two train cars having flaps acting as an aerodynamic fairing;

FIG. 2 is a diagrammatic illustration similar to FIG. 1 but with the cars of the train detached and the flaps indicated in an open condition;

FIG. 3 is a view similar to that of FIG. 1 but showing the cars attached and the flaps open in a manner creating drag braking;

FIG. 4 is a diagrammatic end view of a train car illustrating a series of flaps arranged around an upper circumferential segment of a car end.

DETAILED DESCRIPTION OF THE INVENTION

FIG. 4 diagrammatically illustrates an end view of a high-speed train car having a series of flaps located end-to-end along an upper circumferential segment of the car. In the illustration of FIG. 4, five flaps 1-5 are illustrated. However, it is to be understood that this number is chosen by way of example only. The purpose of the flaps will become evident in the following discussion of FIGS. 1-3.

In FIG. 1, two cars A and B of a simplified train 10 have couplings 12 and 14 connected and have lateral flaps 1 and 5 closed. As will be appreciated, the flaps cover the gap between the cars and thereby reduce the aerodynamic drag when the train is moving at high speed. By including a series of five flaps, as shown in FIG. 4, the gap between the cars can be significantly reduced so as to improve the aerodynamic characteristics of the train.

In the event the cars are to be detached during switching of the cars, the flaps are opened to avoid their damage as indicated in FIG. 2.

FIG. 3 illustrates the position of the flaps when the train is traveling at high speed and additional braking or emergency braking is required. In the figure, the flaps are shown in a pivotally displaced position, oblique to the direction of travel, so as to induce drag on the vehicle.

FIG. 4 shows the detail of the flaps 1-5 appearing along the upper circumferential segment 18 of an end of car A. The flaps are pivotally mounted on the car by respective hinges 16. In the case of the uppermost flap 3, the horizontal flap edges 19 and 20 are shown to be linear thereby conforming to the plane surface forming the top of the car body. In a similar fashion, the sides of the car are illustrated as being planar so that the lateral flaps 1 and 5 include vertical linear edges, as indicated by reference numerals 21 and 22 in FIG. 4. On the other hand, the remaining flaps 2 and 4 are arcuate segments so as to conform with the underlying contour of the car body. This is evidenced by the edges 24 and 26 of flaps 2 and 4. Although confronting edges of adjacent flaps, such as 28 and 30, are shown as being straight, they may be angled or curved so as to create a close edgewise fit to create a more continuous drag braking surface.

In order to control the flap positions between fairing and drag braking modes, a conventional flap actuator 32, which is connected by a conventional coupling diagrammatically illustrated by 34, may be employed. Such actuation may be electrical, pneumatic, or hydraulic.

Although the above description is directed to flaps on a single train car, it is to be appreciated that such flaps may exist on any number of cars in a train and operate in parallel.

As will be appreciated from the description above, the series of actuatable flaps employed in the present invention accomplishes the dual functions of creating an aerodynamic fairing in a first mode and an aerodynamic drag brake in a second mode.

It should be understood that the invention is not limited to the exact details of construction shown and described herein for obvious modifications will occur to persons skilled in the art.

I claim:

1. A dual aerodynamic function assembly for high speed MAGLEV trains having adjacent in-line cars and comprising:
   a series of flaps pivotally mounted by means of a hinge to a circumferential segment of a car end, each flap displaceable to
   a first position covering a gap existing between the car end and a confronting end of an adjacent car thereby serving as a fairing;
   a second position at an oblique angle to the path of travel thereby creating drag on the train resulting in braking; and
   means for actuating the flaps to one or the other position;
   wherein the flaps have rectangular shapes along those lengths of the circumferential segment which are linear; and further wherein
   the flaps have contoured edges along those lengths of the circumferential segment which are curved so as to create a close edgewise fit to create a more continuous drag braking surface.

* * * * *